US008611511B2

(12) United States Patent
McLarty et al.

(10) Patent No.: US 8,611,511 B2
(45) Date of Patent: *Dec. 17, 2013

(54) CONTACT NUMBER ENCAPSULATION SYSTEM

(75) Inventors: Brandon D. McLarty, Indianapolis, IN (US); Frederick Wittekind, IV, Columbus, IN (US)

(73) Assignee: One Number Corporation, Anderson, IN (US)

( * ) Notice: Subject to any disclaimer, the term of this patent is extended or adjusted under 35 U.S.C. 154(b) by 137 days.

This patent is subject to a terminal disclaimer.

(21) Appl. No.: 13/325,229

(22) Filed: Dec. 14, 2011

(65) Prior Publication Data

US 2012/0113872 A1 May 10, 2012

Related U.S. Application Data

(63) Continuation of application No. 11/972,114, filed on Jan. 10, 2008, now Pat. No. 8,107,603, which is a continuation of application No. 11/206,689, filed on Aug. 18, 2005, now Pat. No. 7,680,256.

(51) Int. Cl.
  *H04M 11/00* (2006.01)
(52) U.S. Cl.
  CPC .................................... *H04M 11/00* (2013.01)
  USPC .............. 379/90.01; 379/100.01; 379/211.02; 379/93.04
(58) Field of Classification Search
  USPC ................... 379/100.01, 90.01, 93.04–93.09, 379/211.02–211.04, 212.01
  See application file for complete search history.

(56) References Cited

U.S. PATENT DOCUMENTS

| 5,166,972 | A | 11/1992 | Smith |
| 5,206,901 | A | 4/1993 | Harlow et al. |
| 5,454,032 | A | 9/1995 | Pinard et al. |
| 5,475,748 | A | 12/1995 | Jones |
| 5,802,160 | A | 9/1998 | Kugell et al. |
| 5,904,013 | A | 5/1999 | Greenspan et al. |
| 5,930,338 | A | 7/1999 | McKendry et al. |

(Continued)

FOREIGN PATENT DOCUMENTS

WO    WO 00/76158    12/2000

OTHER PUBLICATIONS

Broadsoft—Simultaneous Ring Personal—Functional Specification, Feb. 13, 2002.

(Continued)

*Primary Examiner* — Melur Ramakrishnaiah
(74) *Attorney, Agent, or Firm* — Dean E. McConnell (57) ABSTRACT

A contact number encapsulation system is disclosed that is operable to consolidate a plurality of contact numbers associated with a given user into a single contact number. The system includes a call processing application that uses information contained in a message header to determine a list of contact numbers to call. The message header contains a call destination indication that is used by the call processing application to retrieve the list of contact numbers. The list of contact numbers is user defined and may be updated or modified by an account holder at any given time. Once the list of contact numbers is obtained, a simultaneous call module is used to simultaneously call each number. The account holder only needs to provide the primary contact number to individuals desiring to reach them instead of various numbers that are associated with locations the account holder may be located.

20 Claims, 8 Drawing Sheets

(56) References Cited

U.S. PATENT DOCUMENTS

| | | | |
|---|---|---|---|
| 5,930,700 | A | 7/1999 | Pepper |
| 6,005,870 | A | 12/1999 | Keung et al. |
| 6,020,980 | A | 2/2000 | Freeman |
| 6,205,139 | B1 | 3/2001 | Voit |
| 6,215,790 | B1 | 4/2001 | Voit et al. |
| 6,233,317 | B1 | 5/2001 | Homan et al. |
| 6,304,649 | B1 | 10/2001 | Lauzon et al. |
| 6,317,485 | B1 | 11/2001 | Homan et al. |
| 6,438,223 | B1 | 8/2002 | Eskafi |
| 6,477,246 | B1 | 11/2002 | Dolan |
| 6,563,911 | B2 | 5/2003 | Mahoney |
| 6,587,458 | B1 | 7/2003 | Burg et al. |
| 6,597,781 | B2 | 7/2003 | Schwab et al. |
| 6,625,258 | B1 | 9/2003 | Ram et al. |
| 6,631,186 | B1 | 10/2003 | Adams |
| 6,683,870 | B1 | 1/2004 | Archer |
| 6,687,360 | B2 | 2/2004 | Kung |
| 6,694,004 | B1 | 2/2004 | Knoerle et al. |
| 6,697,478 | B1 | 2/2004 | Meldrum |
| 6,751,216 | B2 | 6/2004 | Johnson |
| 6,775,264 | B1 | 8/2004 | Kurganov |
| 6,778,640 | B1 | 8/2004 | Zhang et al. |
| 6,807,257 | B1 | 10/2004 | Kurganov |
| 6,816,582 | B2 | 11/2004 | Levine et al. |
| 6,898,275 | B2 | 5/2005 | Dolan |
| 6,937,713 | B1 | 8/2005 | Kung |
| 6,940,951 | B2 | 9/2005 | Mahoney |
| 6,954,524 | B2 | 10/2005 | Gibson |
| 6,978,004 | B1 | 12/2005 | Levine |
| 6,993,360 | B2 | 1/2006 | Plahte |
| 7,020,259 | B2 | 3/2006 | Hussain |
| 7,076,045 | B2 | 7/2006 | Gibson |
| 7,088,810 | B1 | 8/2006 | Burg |
| 7,092,498 | B2 | 8/2006 | Hariri et al. |
| 7,103,167 | B2 | 9/2006 | Brahm et al. |
| 7,142,644 | B2 | 11/2006 | Lockwood |
| 7,142,646 | B2 | 11/2006 | Zafar |
| 7,143,417 | B2 | 11/2006 | Myers |
| 7,149,506 | B2 | 12/2006 | Osterhout |
| 7,162,236 | B2 | 1/2007 | Dorenbosch et al. |
| 7,194,079 | B1 | 3/2007 | Straub et al. |
| 7,227,940 | B2 | 6/2007 | Gibson |
| 7,248,577 | B2 | 7/2007 | Hakusui |
| 7,254,225 | B2 | 8/2007 | Schwab |
| 7,257,201 | B2 | 8/2007 | Singh et al. |
| 7,266,091 | B2 | 9/2007 | Singh et al. |
| 7,277,735 | B1 | 10/2007 | Oh et al. |
| 7,379,543 | B2 | 5/2008 | Hariri et al. |
| 7,380,022 | B2 | 5/2008 | Tell et al. |
| 7,474,741 | B2 | 1/2009 | Brunson et al. |
| 7,610,384 | B1 | 10/2009 | Schulzrinne |
| 7,640,306 | B2 | 12/2009 | Appelman et al. |
| 7,688,958 | B2 | 3/2010 | Dolan et al. |
| 2001/0023400 | A1 | 9/2001 | Kurganov et al. |
| 2002/0076022 | A1 | 6/2002 | Bedingfield |
| 2002/0111990 | A1 | 8/2002 | Wood et al. |
| 2003/0063733 | A1 | 4/2003 | Levine et al. |
| 2003/0123622 | A1 | 7/2003 | Gifford |
| 2003/0152199 | A1 | 8/2003 | Kuhn et al. |
| 2003/0210776 | A1* | 11/2003 | Sollee et al. ............. 379/218.01 |
| 2004/0003114 | A1 | 1/2004 | Adamczyk |
| 2004/0114749 | A1 | 6/2004 | Hayley et al. |
| 2004/0203664 | A1 | 10/2004 | Lei |
| 2004/0258233 | A1 | 12/2004 | Poutschi |
| 2005/0007999 | A1 | 1/2005 | Becker et al. |
| 2005/0055413 | A1* | 3/2005 | Keohane et al. ............. 709/207 |
| 2005/0063529 | A1 | 3/2005 | Meldrum et al. |
| 2005/0069097 | A1 | 3/2005 | Hanson et al. |
| 2005/0070286 | A1 | 3/2005 | Awasthi |
| 2005/0074109 | A1 | 4/2005 | Hanson et al. |
| 2005/0123118 | A1 | 6/2005 | Terry |
| 2005/0130631 | A1 | 6/2005 | Maguire |
| 2005/0130642 | A1 | 6/2005 | Scott |
| 2005/0141490 | A1 | 6/2005 | Dolan |
| 2005/0177622 | A1 | 8/2005 | Spielman |
| 2005/0251822 | A1* | 11/2005 | Knowles et al. ................. 725/39 |
| 2005/0276397 | A1* | 12/2005 | Hiatt et al. ................. 379/90.01 |
| 2006/0104431 | A1 | 5/2006 | Emery et al. |
| 2006/0105766 | A1 | 5/2006 | Azada |
| 2006/0112400 | A1* | 5/2006 | Zhang et al. ................... 719/328 |
| 2006/0126806 | A1 | 6/2006 | Trandal et al. |
| 2006/0133348 | A1* | 6/2006 | Ho ................................. 370/352 |
| 2006/0153353 | A1* | 7/2006 | O'Neil ..................... 379/211.02 |
| 2006/0153354 | A1 | 7/2006 | Brahm |
| 2006/0160566 | A1 | 7/2006 | Plahte et al. |
| 2006/0210024 | A1 | 9/2006 | Qiu |
| 2006/0215830 | A1 | 9/2006 | Simpson |
| 2006/0217133 | A1 | 9/2006 | Christenson |
| 2006/0218268 | A1 | 9/2006 | Beck et al. |
| 2006/0227957 | A1 | 10/2006 | Dolan et al. |
| 2006/0251236 | A1 | 11/2006 | Peters et al. |
| 2007/0003043 | A1 | 1/2007 | Kapur |

OTHER PUBLICATIONS

Broadsoft—Release Notes—Release 4, Rel. 4.0.91.7.41, Sep. 17, 2001.
Solaxis—Accessline Services Reseller Agreement, Jul. 1, 2001.
Solaxis—Accessline Services Reseller Agreement—Amendment No. 1, Jan. 23, 2004.
Solaxis—Accessline Services Reseller Agreement—Amendment No. 2, Jan. 26, 2005.
uReach.com Products—Webpage Product Description, Copyright 2004 uReach Technologies.
uReach—Unified Communications—Webpage, Copyright 2002 uReach Technologies.
uReach—News—Webpage, Copyright 2001 uReach Technologies.
Bell Canada—Single Number Reach, Sep. 16, 2003.
Attack Aftermath Pushes Up New Verizon Service—Alorie Gilbert, Oct. 1, 2001.
Communications Solutions, Nov. 2001 Issue, p. 23.
New Verizon Service Provides Universal Phone Number; Convenience of One Place to Check for E-mail, Voice Mail and Faxes, Verizon Communications Press Release, Jan. 22, 2002.
Simulring Trademark File History.
SIP: Session Initiation Protocol. Mar. 1999.
Nortel. MCS 5100 End User Feature Description Guide. Jul. 2004.
SIP: Session Initiation Protocol. Jun. 2002.
*RingCentral* v *McLarty*. Complaint. Mar. 5, 2010.
RTP: A Transport Protocol for Real-Time Applications. Jul. 2003.
RTP: A Transport Protocol for Real-Time Applications. Jan. 1996.
File History of U.S. Patent No. 7,680,256, Mar. 16, 2010.
File History of U.S. Patent No. 7,440,565, Oct. 21, 2008.
File History of U.S. Patent No. 8,107,603, Jan. 31, 2012.
File History of Inter Parte Reexamination of U.S. Patent No. 7,680,256 as of Jul. 18, 2012, Reexamination No. 95/001,409.
File History of Inter Parte Reexamination of U.S. Patent No. 7,440,565 as of Jul. 18, 2012, Reexamination No. 95/001,408.
Request for Ex Parte Reexamination of U.S. Patent No. 7,440,565. Google, Inc., Dec. 21, 2010.
airBand. airBand Configuration of Find-Me Feature Version 3. May 11, 2005.
Columbia University. A Framework for Telephony Routing over IP. Jun. 2000.
Tekelec, Inc. System Applications and Description. Copyright 2000-2003.
Tekelec, Inc. Web Portal Quick Reference Card. Copyright 2004.
Tekelec, Inc. Web Portal User Guide. Copyright 2000-2003.
Tekelec, Inc. Tekelec Enhances T6000 VoIP Application Server. Jun. 1, 2005.
Business Wire. Vortex Broadband Deploys Tekelec's Next-Generation Network Solutions. Feb. 14, 2005.
Schulzrinne, H.G., and Rosenburg, J.D.. The Session Initiation Protocol: Providing Advanced Telephony Services Across the Internet. Bell Labs Technical Journal. Oct.-Dec. 1998, pp. 144-160.
AT&T. AT&T Personal Reach Service Benefits & Features. AT&T Personal Reach Service. 2000.

(56) References Cited

OTHER PUBLICATIONS

Singh, K., Jiang, W., Lennox, J., Narayanan, S., and Schulzrinne, H.G. CINEMA: Columbia InterNet Extensible Multimedia Architecture. Columbia University Technical Report CUCS-011-02. New York City, NY. Apr. 26, 2002.
Fuhrt, B., and Ilyas, M. Wireless Internet Handbook Technologies, Standards, and Applications. CRC Press LLC. 2003. Chapter 9, pp. 197-255.
Lennox, J. Services for Internet Telephony. Columbia University. 2004. Submitted in partial fulfillment of the requirements for the degree of Doctor in Philosophy in the Graduate School of Arts and Sciences. 208 pages.
HTML 4.01 Specification, W3C Recommendation. Dec. 24, 1999.
Blankenhorn, D. "Voice Activated Dialer for the Mobile Cellular Telephone 3030 (Product Announcement)." Newsbyte. Jan. 17, 1992. File Segment: NW File 649. Gale Group Computer DB (Dialog File 275).
Bradbury, J. "Dial M for Macintosh. (Sophisticated Circuits' Desktop Dialer Telephone Dialing Device for the Macintosh)." MacUser, V. 9, N. 3, p. 118(1). Mar. 1993. Gale Group Computer DB (Dialog File 275).
Business Wire. "iVoice Receives Patent Award for Speech Enables, Automatic Telephone Dialer Using Names, Including Seamless Interface with Computer-Based Address Book Programs." Business Wire. p. 5288. May 28, 2003. (Dialog File 621).
EDGE. "Cellular voice recognition: AT&T intros speaker dependent voice dialer technology in cellular market. (AT&T's Voice Activated Dialer for its Mobile Cellular Telephone 3030)(Product Announcement)." EDGE, on and about AT&T, V. 7, N. 181, p. 8(1). Jan. 13, 1992. Gale Group Computer DB (Dialog File 275).
Levergood, T.M., et al. "AudioFile: A Network-Transparent System for Distributed Audio Applications (1993)." Book, http://citeseer.ist.psu.edu/28948.html.
Lin, S.C., et al. "The Development of FAX Broadcasting System." System Theory, 1995. Proceedings of the Twenty-Seventh Southeastern Symposium. Pub. Date: Mar. 12-14, 1995, pp. 212-215. INSPEC Accession No. 4917805.
Lin, S.C., et al. "FAX Broadcasting System—The software aspects." Communications, Computers and Signal Processing, 1995. Proceedings, IEEE Pacific Rim Conference. Pub. Date May 17-19, 1995, pp. 554-557. INSPEC Accession No. 5112620.
PC Week. "Micro Logic PIM upgrade adds phone dialer, network support. (Micro Logic Corp. introduces InfoSelect personal information manager)(product announcement)." PC Week. V. 7, No. 12, p. 24(1). Mar. 26, 1990. Gale Group Computer DB (Dialog File 275).
Szlam, A., et al. Predictive Dialing Fundamentals: An Overview of Predictive Dialing Technologies, Their Applications, and Usage Today. Paperback, 172 pages. Pub. Date Jan. 1996. CMP Publications.
Business Wire. "SpeedSwitch Receives Patent Award for 'TPI Interface Based, Speech Enabled Automatic Telephone Dialer Using Names;' Company Secures Third Speech-Recognition Patent." Business Wire. p. NA. Aug. 24, 2005.
RingCentral Press Release—"'Looking Large'—How a Two Person Company Wins by Using 5 Extensions." Nov. 19, 2003.
RingCentral Press Release—"RingCentral Announces Virtual Local Telephone Numbers in Major U.S. Cities." Jan. 22, 2004.
Avaya—Avaya IP Office Applications.
Avaya—IP Office 2.1—Product Description, May 11, 2004.
Avaya—Modular Messaging, Release 2—Telephone User Interface Guide, Sep. 2004.
Avaya—Modular Messaging—Release 2—Telephone User Interface Guide, Sep. 2004.
Avaya—Voicemail Pro 3.0—Installation & Maintenance, Jan. 15, 2005.
Centrex, IP Style, Woods, Darrin, Network Computing, Jul. 10, 2003; 14, 13; ProQuest Central p. 58.
Covad—Frequently Asked Questions, Mar. 1, 2004.
GoBeam: PBX-paradise by the DashBoard light?, Gallo, Michael, Apr. 20, 2002, ProQuest Central, p. 70.
GoBeam—Voicemail Via Outlook and Other Email Clients, Copyright 2001 GoBeam.
GoBeam, Dashboard, 1 page webscreen shot.
IP Centrex—Can hosted, IP-based telephony and communication services win over premise-equipment purists?, Richard Grigonis and Andy Green, Communication Convergence, Nov. 1, 2002.
Onebox . . . The Power of Fax, Email Voicemail . . . , Unknown Publication Date.
Sylantro Systems Selected by GoBeam to Deliver Innovative Managed Business Communications Services, Business Wire, Oct. 30, 2000.
uReach and NMS—Voice-Enhanced Messaging Services, Unknown Publication Date.
SSC Advisory TSA-053 (Ureach.com), Nov. 5, 2004.
UReach.com—uConnect Service User Guide, Copyright 2003-2004.
SysMaster GW 7000 Digital Gateway—User Manual version 1.0—Copyright 2003.
http://www.sysmaster.com/p_vp_followme.htm, Publication Date Unknown.
Sylantro's Communications Suite—ComCierge, Publication Date Unknown.
VocalData—VOISS Web Portal—User Guide, Copyright 2000-2003.
Happy Diwali—A Festival of Light—An Overview of CINEMA Implementation, Kundan Singh, Nov. 14, 2001.
Media Services in CINEMA, Kundan Singh, Apr. 25, 2003.
Nortel Networks—Nortel Networks Multimedia Communication Server (MCS) 5100, Feb. 2004.
Nortel Networks—Personal Agent User Guide, Jul. 2004.
Nortel Networks—Integrating next generation multimedia services to existing telephones, Tim Youm, Apricot 2004.
Nortel Networks—SIP and the new network communications model, Copyright 2003 SBC Knowledge Ventures L.P., Copyright 2003 Nortel Networks.
Nortel Networks—Meridian 1—Communications solutions for the evolving enterprise, Copyright 2002, Nortel Networks.
LG-Nortel—iPECS—Intelligent communication solutions for your dynamic business, Copyright 2005, March, LG Nortel Co. Ltd.
Nortel Networks—SIP Personal Agent User Guide, Apr. 2003.
Randy E. Moretz—Wildfire—Your Electronic Assistant, Publication Date Unkown.
Wildfire! Reseller Program Information Sheet, Publication Date Unknown.
Wildefire! Price Sheet—Effective Thursday, Sep. 1, 2005, Publication Date Unknown.
CINEMA (Columbia InterNet Extensible Multimedia Architecture), System Diagram, Columbia University, Publication Date Unknown.
Guidelines for Usage of the Session Initiation Protocol (SIP) Caller Preferences Extension, Jun. 2003.
Integrating Internet Telephony Services, Wenyu Jiang, Jonathan Lennox, Sankaran Narayanan, Henning Schulzrinne, Kundan Singh, and Xiaotao Wu, May-Jun. 2002.
Computer Networks—An architecture for IN-internet hybrid services, C.A. Licciardi, G Canal, A. Andreetto, P. Lago, 2001.
RingCentral Online—User Guide V. 1.0, Publication Date Unknown.
RingCentral Telephone User Guide, Publication Date Unknown.
RingCentral User Guide, Nov. 2005.
Avaya—Avaya MERLIN MAGIX Integrated System, Copyright 2004 Avaya, Inc.
Avaya—Avaya IP Office Messaging & Call Handling, Copyright 2004 Avaya Inc.
Avaya—Avaya IP Office Applications, Copyright 2002 Avaya Inc.
RingCentral SIP Architecture, Publication Date Unknown.
File History of Inter Parte Reexamination of U.S. Patent No. 7,680,256—Aug. 21, 2012 to Oct. 22, 2012.
File History of Inter Parte Reexamination Control No. 95/001,409 of U.S. Patent No. 7,680,256—Aug. 21, 2012 to Oct. 22, 2012.
File History of Inter Parte Reexamination Control No. 95/001,408 of U.S. Patent No. 7,440,565—Jul. 25, 2011 to Aug. 24, 2012.
*One Number Corporation v. Google, Inc.*, U.S. District Court for the Southern District of Indiana, Cause 1:10-cv-0312 RLY-TAB, Respective Pleadings from Litigation Matter.

(56) References Cited

OTHER PUBLICATIONS www.businessphonesolutions.com. AccessLine SmartOFFICE—Auto Attendant. 2005.
www.voicemailandfax.com. AccessLine SmartMESSAGE—Voicemail & Fax. 2005.
www.findmephone.com. AccessLine SmartNUMBER—Follow-Me Number. 2005.
www.ringcentral.com. Plan Description. Undated.
www.onebox.com. Advanced Communications for the 21st Century. Apr. 4, 2006.
RingCentral. Customer Quotes: Call Forwarding. 1999-2004.
RingCentral. Customer Quotes: Fax. 1999-2004.
RingCentral. Call Screening and Internet Caller ID. Dec. 30, 2004.
RingCentral. 800 Toll-Free Numbers. Dec. 30, 2004.
RingCentral. Local Phone Numbers. Jan. 1, 2005.
RingCentral. Unified Messaging Services. Jan. 5, 2005.
RingCentral. RingCentral Customer Testimonials. Nov. 12, 2004.
RingCentral. Toll-Free Numbers. Dec. 30, 2004.
RingCentral. RingCentral Customer Testimonials. Dec. 14, 2004.
RingCentral. RingCentral Virtual Extensions. Jan. 7, 2005.
Accessline Communications. Unified Messaging. Undated.
Vonage. Caller ID with Name. Oct. 13, 2004.
Accessline Communications. Other Services—Follow-Me Numbers. Undated.
RingCentral. RingCentral Customer Quotes: Voicemail. Nov. 12, 2004.
RingCentral. RingCentral Choose the Plan that's Best for You! Jan. 7, 2005.
RingCentral. RingCentral Voicemail. Jan. 12, 2005.
RingCentral. RingCentral Call Forwarding. Dec. 11, 2004.
Terri Kouba. UniBears: Moving forward with Call Sciences. Spring 2003.
Vonage. Online Account Management. Oct. 10, 2004.
Vonage. Products and Services. Oct. 9, 2004.
RingCentral. Service Description. Dec. 14, 2003.
Accessline. Next Generation Voice Services. Apr. 8, 2005.
RingCentral. Your All-Inclusive Toll Free and Local Number Service. Jan. 12, 2005.
Vonage. Call Waiting Never Miss. Oct. 15, 2004.
RingCentral. Customer Quotes by Industry. Dec. 10, 2004.
Vonage. Called ID Block (*67). Oct. 15, 2004.
Onebox. Unified Messaging. Apr. 3, 2005.
Onebox. Onebox Executive Personal Receptionist. May 12, 2005.
Vonage. Learning Center. Oct. 6, 2004.
Vonage. Voicemail plus. Oct. 15, 2004.
Vonage. Call Forwarding. Nov. 20, 2004.
RingCentral. Virtual Calling Card. Dec. 4, 2004.
Vonage. Call Forwarding User Guide. Jan. 12, 2005.
RingCentral. Virtual PBX. Dec. 12, 2004.
RingCentral. Internet Fax Service. Jan. 11, 2005.
Doc 44. Google Inc's Answer and Counterclaims to One Number.
Doc 114. Joint Claim Construction Statement.
*One Number* v *RingCentral* Complaint.
RingCentral. The Ultimate Communications Service for Growing Business. Undated.
RingCentral. Your All-in-One Toll Free Service. Jun. 19, 2004.
AccessLine. Terms & Conditions. Mar. 5, 2005.
The New York Times. State of the Art; Cut-Rate Calling. Apr. 8, 2004.
AccessLine. Follow Me Number Apr. 8, 2005.
AT&T CallVantage. Mar. 22, 2005.
Session initiation protocol (SIP)-Specific Event Notification. Jun. 2002.

* cited by examiner

Figure 1

| Primary Contact Number | Associated Contact Numbers |
|---|---|
| xxx-xxx-xxxx | Contact Number A |
| | Contact Number B |
| | Contact Number C |
| | Contact Number D |
| | Contact Number E |

CONTACT NUMBER ENCAPSULATION SYSTEM

CROSS REFERENCE TO RELATED APPLICATION

The present application is a continuation application of and claims the benefit of U.S. application Ser. No. 11/206,689, now U.S. Pat. No. 7,680,256, entitled "Contact Number Encapsulation System" filed on Aug. 15, 2005, which is hereby incorporated by reference in its entirety.

BACKGROUND OF THE INVENTION

1. Technical Field

The present invention relates generally to communication systems and more particularly, to a method and system for allowing telephone users to cause multiple phone lines to ring when a calling party dials a single primary contact number thereby eliminating the need for providing multiple contact numbers to third parties.

2. Related Art

The history of modern-day communications technology can be said to have started when Samuel Morse invented the wire line telegraph in 1832. However, it was Alexander Graham Bell's invention of the telephone, in 1874, that led to the development of our present day communications technology. Morse had simply created a way for humans to extend their ability to transfer information—instantly—over great distances. Bell gave us the ability to have the most intimate form of communication over distances—the use of our voices. As readily apparent, the invention of the telephone has dramatically changed the manner in which people communicate with one another and most people have telephones located at various access points or locations at any given time and are responsible for knowing or having access to various contact numbers associated with them.

The concept of the telephone instrument, as well as the system that allows it to work, was initially so strong that most communication technology developed during the past 125 years supports an efficient voice communication network. It wasn't until 2004 that major telecommunication carriers announced the need to develop, and support, a network designed for the purpose of transporting digital data. From 1874 to 1980, communication networks around the world were constructed to facilitate the efficient and economical transmission of voice conversations. Multiplexing and digital transmission systems were developed to "cram" more voice conversations into the existing copper wire communication facilities.

The Internet, first developed in 1973 as a project for the U.S. Department of Defense Advanced Research Projects Agency (ARPA), initiated a profound change in the future development of communication networks and technologies. Originally called the Arpanet, linking several Universities and research laboratories, it evolved into the world wide web ("WWW"). During this period, there were a number of significant technology advances and government enforced corporate reorganizations that helped to change the direction of communication systems development. Computing and communications technologies were provided a big boost by the invention of the integrated circuit (IC) in 1959. The IC permitted development and manufacture of smaller and more automated communication devices at a very low cost. The Carterphone Decision, by the U.S. Supreme Court, in 1968, made it possible for the connection of non-telephone company owned devices (until this point, only devices owned and operated by the telephone companies were permitted). In the 1970s, fiber strands were first used as a communication medium. In 1983, the U.S. Supreme Court mandated reorganization of AT&T was enforced.

New inventions coupled with increasing business and consumer demand for computer and data communication services forced a change in, the nature of the development of communications networks. By 1995, most installation of communications networks was devoted to the efficient transmission of data generated by computers. However, these networks were still based on a voice communication design. The development and introduction of broadband data communications standards ("IEEE 802 Series") helped to create a demand for communication networks designed to support data communications. By 2003, wireless (cellular telephone) networks were available to almost every location of the United States (remote wilderness areas still lack coverage). According to the Cellular Telecommunications & Internet Association (CTIA), in 2003 there were more than 148 million wireless subscribers, and 92% were using digital service.

As communication technology continues to move forward and various types of devices become available that are capable of allowing people to communicate with one another, the amount of contact numbers associated with individuals will continue to grow dramatically. It is not uncommon for any given person to have four or five different contact numbers associated with them at any given time. For example, it is not uncommon for a single person to have a home phone number, a work phone number, a wireless terminal phone number, and a facsimile number. As a result, it is increasingly difficult to get in contact with any given individual because the calling party may not know exactly where the person they are trying to reach is located. Further, the calling party may only know one phone number for the individual they are trying to reach.

As a result of the aforementioned problems, a need exists for a communication encapsulation system that will work in conjunction with a wide variety of communication devices and systems to allow a single person to have one primary contact number instead of multiple contact numbers.

SUMMARY OF THE INVENTION

A contact number encapsulation system is disclosed that allows an account holder to be assigned a primary contact number for use in connection with conducting voice-based communication. Although the primary contact number is preferentially for use in voice communication, the contact number encapsulation system may also be capable of receiving incoming facsimiles as well. The primary contact number may be a custom telephone number that is assigned to a user at the time of account setup or it may be a telephone number that is transferred from a previous service provider at the time of account setup. The contact number encapsulation system allows people desiring to contact the owner of the primary contact number to use one number to reach the owner at various locations instead of the contact number that may be assigned to the owner at each respective location. Dialing the primary contact number will cause a plurality of user designated contact numbers to ring at the same time, thereby allowing individuals to only have one telephone number associated with them instead of multiple contact numbers for various locations.

The contact number encapsulation system may include a calling terminal that a caller may use to attempt to reach the owner of the primary contact number. Once the primary contact number is dialed by the calling terminal, the call may be routed to a call router through the assistance of various different types of communication networks depending on what network the calling terminal is connected with at the time of making the call. The call router is operable to route the call to a predetermined destination. The primary contact number may be contained in a list in a database associated or connected with the call router that associates the primary contact number with a call processor server. The call router may use a lookup module to determine an IP address the call should be routed to by the call router, which in the present invention, corresponds to the call processor server.

The call processor server may include a validation module that determines if the primary contact number that is associated with the incoming call is a valid primary contact number. If the call designates a valid contact number, an answering module may answer the incoming call thereby establishing a communication session between the calling terminal and the call processor server. If the incoming call is a facsimile, the answering module will forward the call to a facsimile module that is operable to receive the incoming facsimile images and then forward them to a user designated email address as an attachment. If the incoming call is a voice call, the answering module may forward the call to an interactive voice response application.

The interactive voice response application may include a message module that plays a short introductory message recorded by the owner of the primary contact number or a default computer generated message. A service option module may then be used to present the calling party with various contact options (e.g.—"Press 1 to contact Jane Doe", "Press 2 to leave a message for Jane Doe" and so forth). If the user selects the option associated with contacting the owner of the primary contact number (e.g.—by pressing 1 on the calling terminal), a multiple contact module may prompt the user to record a short introductory message (e.g.—"Please state your name"). The multiple contact module may store the message and then use a multiple contact lookup module to generate a list of contact numbers associated with the owner of the primary contact number.

The owner of the primary contact number may provide with at least two options to manage his/her account. The first option is a web-enabled control panel that allows the owner to enter contact numbers to be associated with the primary contact number. As such, once the owner logs into his/her account, they are provided with a control panel that allows them to enter the telephone numbers they want contacted if the primary contact number is dialed. The second option is a voice portal menu-based option, which allows the owner to call the primary contact number, enter designated access codes, and gain access to his/her account. The owner may then be provided with a menu of options that allows the owner to enter, edit, or delete contact numbers from their respective contact number list.

Once the list of contact numbers associated with the primary contact number is obtained or generated, a simultaneous calling module may be used to setup a plurality of calling sessions with all of the terminals associated with the numbers contained in the contact list. As such, the simultaneous calling module simultaneously calls every number in the contact list to attempt to reach the owner of the primary contact number. If the owner of the primary contact number answers one of the terminals, a media session may be established between the call reception terminal and the call processor server. The multiple contact module may then play the short introductory message recorded by the caller to the owner and prompt the owner to either accept the call or send the call to voice mail. If the owner accepts the call, a voice based media session is established between the calling terminal and the call reception terminal. If the owner declines to accept the call, the calling party may then be directed to a voice mail application by the multiple contact module.

The contact number encapsulation system allows individuals to have one contact number associated with them instead of a plurality of contact numbers. Multiple contact numbers are difficult to remember, time consuming to locate, and time consuming to call each location that the party may be in an attempt to locate them. The present invention provides a method of allowing individuals to only have one contact number associated with them while at the same time allowing them to be reached at various locations in which they may have different contact numbers. The contact number encapsulation system is operable to simultaneously dial every user designated contact number that may be associated with the account owner when the primary contact number of the owner is dialed.

Other systems, methods, features and advantages of the invention will be, or will become apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

DETAILED DESCRIPTION OF THE PRESENTLY PREFERRED EMBODIMENTS

Figure 1:
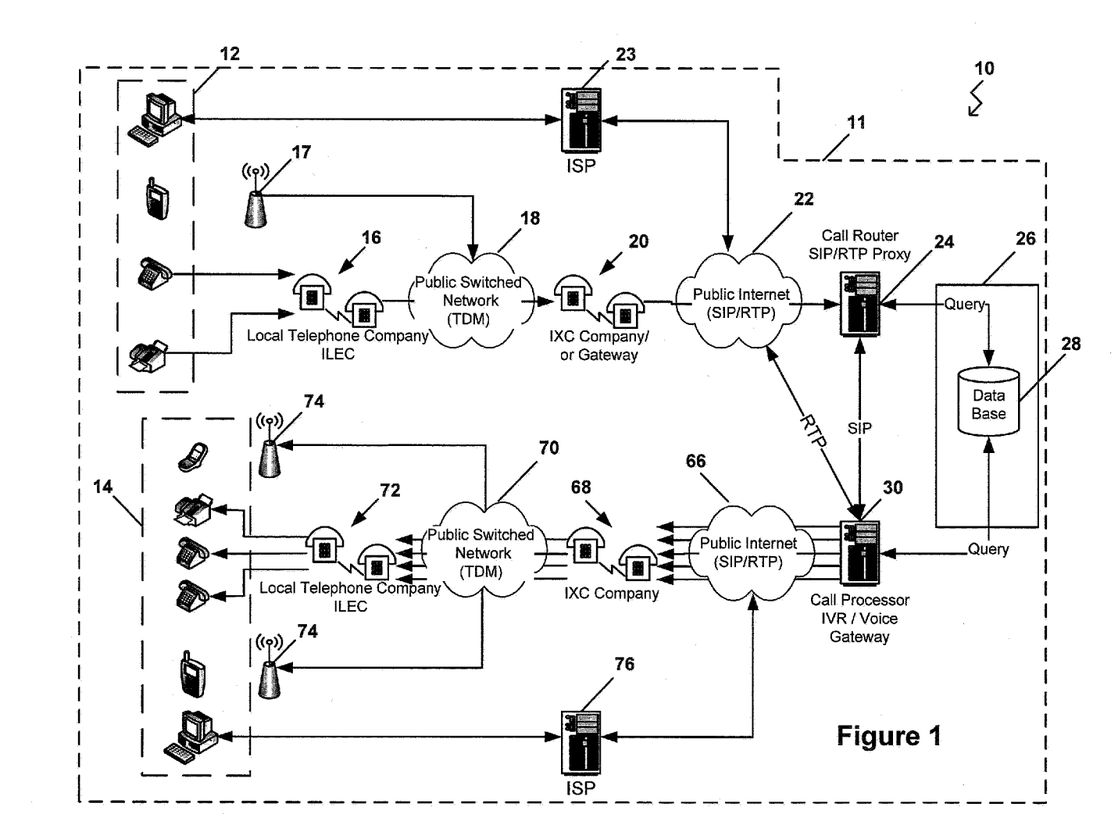
FIG. 1 represents an illustrative communication network in which an embodiment of the present invention may operate.

Referring to FIG. 1, a logical network flow in which a contact number encapsulation system 10 may function is illustrated. The contact number encapsulation system 10 allows a caller, with the assistance of a calling terminal 12, to place voice calls, send faxes, and send text messages to a call reception terminal 14 over a communication network 11. The calling terminal 12 or the call reception terminal 14 may be a wireless terminal, a wired terminal or phone, a facsimile terminal, an Internet based terminal using voice-over IP ("VoIP") technology or any one of a variety of other types of communication devices. For the purpose of the present invention, it is important to note that the communication network 11 is operable to allow communication, preferentially voice-based communication, to be conducted between the calling terminal 12 and the call reception terminal 14. This is accomplished by establishing a communication path or link between the respective terminals 12, 14 being used by the parties to communicate.

The communication network 11 may include an incumbent local exchange carrier ("ILEC"), a competitive local exchange carrier ("CLEC"), a regional bell operating company ("RBOC") 16 that is connected with the calling terminal 12. In the alternative, the calling terminal 12 may be a wireless terminal, in which case the calling terminal may be connected with a wireless communication system 17. The calling terminal 12 may connect to the communication network 11 through the use of a wireless terminal, a traditional wired terminal or phone, a facsimile terminal, or through the use of an Internet based terminal using voice-over IP ("VoIP") technology. The ILEC 16 may be connected with a PSTN 18. The PSTN 18 may be connected with an inter-exchange carrier ("IXC") 20 that is capable of providing interstate (i.e.—long distance) communications services within the U.S.

The IXC 20 may be connected with an Internet portal 22. The Internet portal 22 may rely on different types of communication protocols that allow communication to be conducted over the communication network 11. The Internet portal 22 may use session initiation protocol ("SIP") to communicate or transport data as well as to initiate various types of actions to be taken over portions of the communication network 11. SIP is an IP telephony signaling protocol developed by the Internet Engineering Task Force ("IETF"). It is primarily used for VoIP calls, however, SIP can also be used for video or any media type. SIP may also be used in conjunction with the instant messaging and presence leveraging extensions ("SIMPLE") for instant messaging.

SIP is a text-based protocol that is based on HTTP and MIME, thereby making it suitable and very flexible for integrated voice-data applications. SIP is a signaling protocol used for establishing sessions in an IP network. SIP is designed for real-time transmission, uses fewer resources and is considerably less complex than H.323. Its addressing scheme uses universal resources locators ("URLs") and is human readable; for example: sip:xyz@entity.com. SIP relies on the session description protocol ("SDP") for session description and the real-time transport protocol ("RTP") for actual data transport. In the present invention, once the session is established, RTP may be used to transmit the media (e.g.—audio) between the calling terminal 12 and the call reception terminal 14.

SDP is an IETF protocol that defines a text-based message format for describing a multimedia session. Data such as version number, contact information, broadcast times and audio and video encoding types are included in the message. RTP is an IP protocol that supports real-time transmission of voice and video data streams. It is widely used for IP telephony and audio and video streaming. An RTP packet rides on top of UDP, the counterpart of TCP, and includes time-stamping and synchronization information in its header for proper reassembly at the receiving end. For example, as illustrated in FIG. 1, the contact number encapsulation system 10 may use RTP to transmit audio or video data between the calling terminal 12 and the contact terminals 14 via the call processor server 30.

The Internet portal 22 may be connected with a call router or proxy server 24, which is a network device that forwards data packets from one network to another. Based on internal routing tables, routers read each incoming packet and decide how to forward it. To which interface on the router outgoing packets are sent may be determined by any combination of source and destination address as well as current traffic conditions (load, line costs, bad lines, etc.). In the present invention, the call router 24 may be used to route or direct a call (i.e.—packets of data) being made by the calling terminal 12 to the appropriate or designated call reception terminal 14. The Internet portal 22 may also be connected with an Internet service provider ("ISP") 23 that allows various types of calling terminals 12 (e.g.—personal computers, VoIP terminals) to communicate over the communication network 11.

As set forth in greater detail below, once the call and its associated data reach the call router 24, the call router 24 may include a routing module 26 that determines where the call should be directed or routed. To determine where the call should be routed, the routing module 26 may query a routing database 28. The routing database 28 may contain a routing table that includes a destination address that is dependent on information contained in the call's SIP message header. In the present invention, the information or data contained in the call's SIP message header causes the call router 24 to forward the call to a call processor gateway server 26. The data in the call's SIP message header that the routing module 26 may use corresponds to a primary contact or telephone number that the caller dialed when placing the call from the calling terminal 12. The primary contact number that the calling terminal 12 dials causes the call router 24 to forward the call to the call processor gateway server 26 which then further processes the call.

Figure 2:
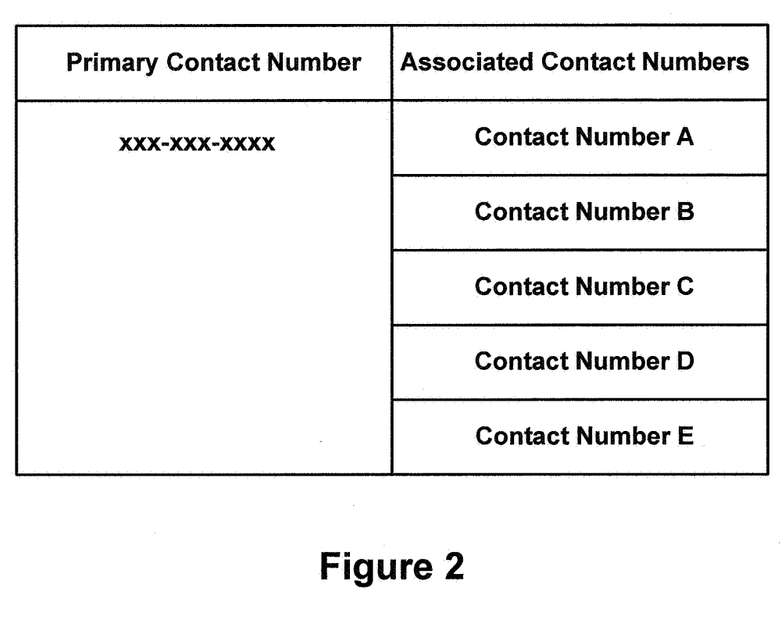
FIG. 2 is a table illustrating the association between a primary contact number and a plurality of other contact numbers associated with a given account holder.

Referring to FIG. 2, the primary contact number may be a user specific telephone number that is assigned to a respective user account at the time the account is setup by the contact number encapsulation system 10. In the alternative, the primary contact number may be transported to the contact number encapsulation system 10 from another carrier via Local Number Portability ("LNP"). As set forth in greater detail below, the owner of the primary contact number may designate a list of contact numbers to be associated with the primary contact number. The right-hand column of the table illustrated in FIG. 2 contains a list of contact numbers that may be associated with the primary contact number listed in the left-hand column. When a caller dials the primary contact number in an attempt to reach the account owner, the contact number encapsulation system 10 retrieves the list of associated contact numbers set forth in FIG. 2 and simultaneously calls all of the contact numbers contained in the list.

Figure 3:
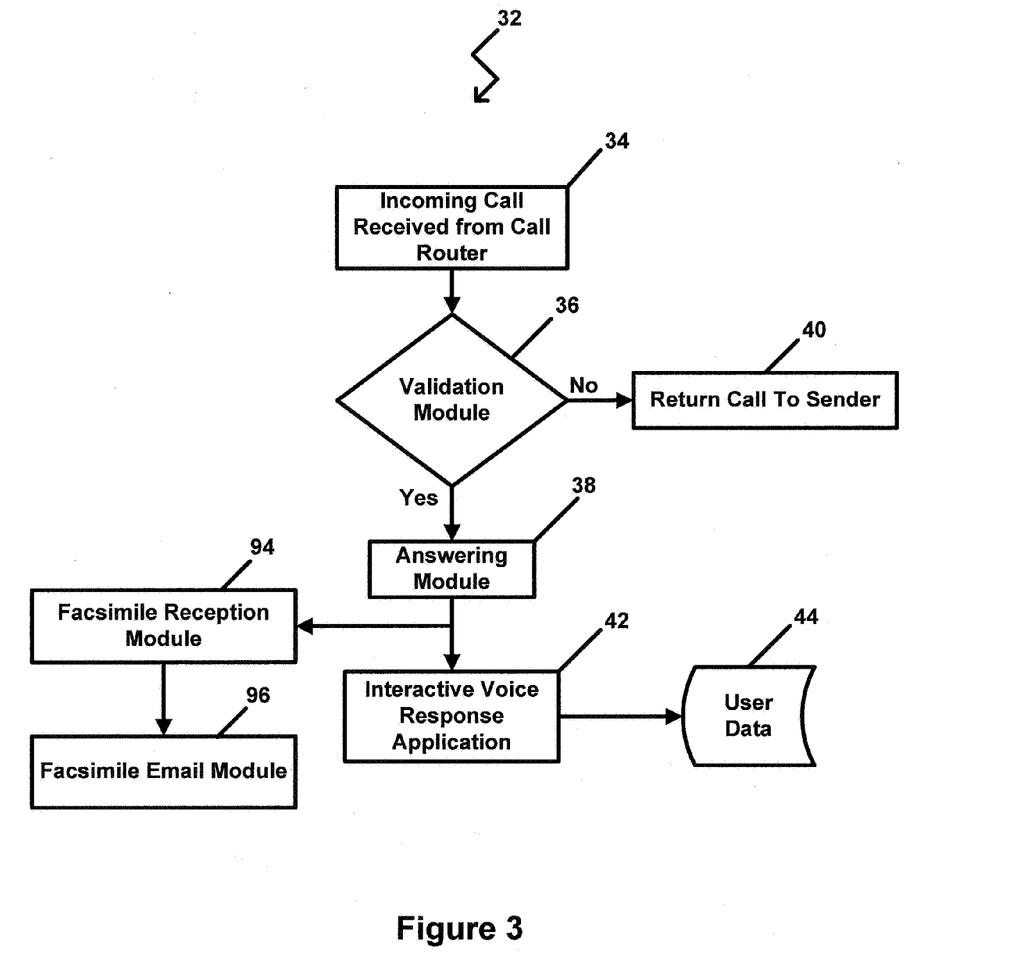
FIG. 3 is a flow chart for a call processing application.

Referring to FIG. 3, the call processor gateway server 30 may include a call processing application 32. The call processing application 32 may receive a call at step 34 from the call router 24 that designates a primary contact number. Once received, the call processing application 32 may include a validation module 36 that determines if the call is a valid primary contact number for the call processor gateway server 26. If the call identifies an invalid primary contact number or a number not associated with the service being provided, the validation module 36 may return the call to the sender at step 40. If the call identifies a valid primary contact number, an answering module 38 may answer the call. The answering module 38 may forward the call to an interactive voice response application 42. The interactive voice response application 42 may access a user database 44 that may contain user preferences and voice recordings to further handle the call, as set forth in greater detail below.

Figure 4:
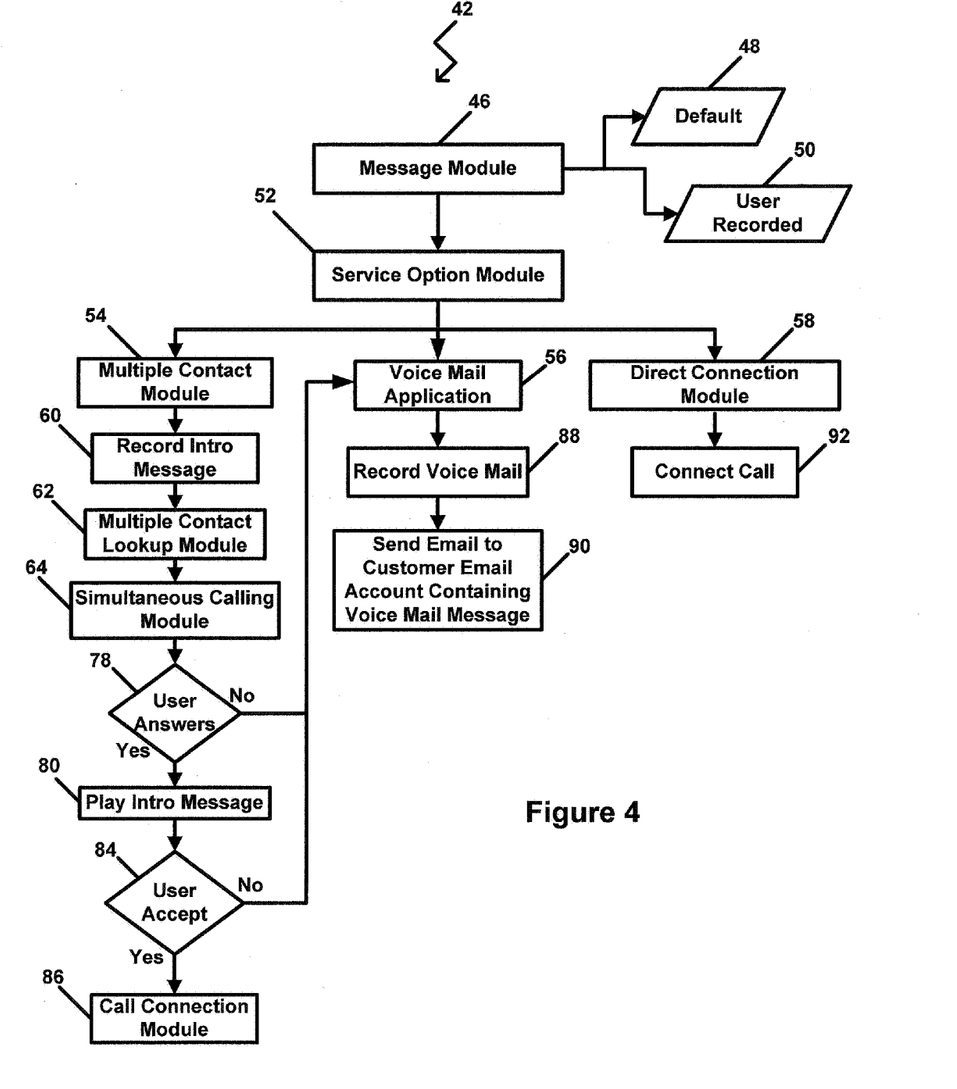
FIG. 4 is a flow chart for an interactive voice response application.

Referring to FIG. 4, the interactive voice response application 42 may include a message module 46. The message module 46 may access a default message 48 or a user recorded message 50 that may be stored in the user database 44. When the call is answered by the answering module 38, the answering module 38 may answer the call and forward it directly to the interactive voice response application 42. The message module 46 may access an account associated with the primary contact number to retrieve either the default message 48 or the user recorded message 50. The message module 46 may use the call receiver's primary contact number as an identifier to lookup the respective message to play. By way of example only, the default message 48 may consist of a computer generated greeting and the user recorded message 50 may consist of a short recording made by the owner of the primary contact number.

After the initial message or greeting is played by the message module 46, the call may be passed or directed to a service option module 52. The service option module 52 may provide a user of the calling terminal 12 with a plurality of options. In an illustrative embodiment of the present invention, the service option module 52 may include a multiple contact module 54, a voice mail application 56, and a direct transfer module 58. The multiple contact module 54 may prompt the caller to record a short introduction message, such as the name of the caller, which is illustrated at step 60. The multiple contact module 54 may then use a multiple contact lookup module 62 to retrieve a list of contact numbers associated with the primary contact number from the user database 44. As set forth in greater detail below, users of the present invention are allowed to store, modify and edit a plurality of terminal contact numbers that are associated with the primary contact number that may be stored in the user database 44.

The multiple contact lookup module 62 may then pass the retrieved list of contact numbers to a calling module 64 that is operational to simultaneously call all of the contact numbers contained in the list of contact numbers. In other words, the calling module 64 simultaneously dials all of the contact numbers associated with the primary contact number at the same time so that all of the call reception terminals 14 associated with the call receiver ring or are called at the same time. This allows the call receiver, who may have numerous telephone numbers, to give out and use one contact number (i.e.—the primary contact number) to be reached at various locations instead of using individual numbers for each respective location.

As illustrated in FIG. 1, the call processor server 30 may be connected with a second Internet portal 66, which in turn may be connected with a second IXC 68. The second IXC 68 may be connected with a second PSTN 70, which in turn may be connected with a second ILEC, CLEC, or RBOC 72 or a second wireless access system 74. A second ISP 76 may also be connected with the second Internet portal 66 that is operable to allow various types of call reception terminals 14 (e.g.—computer terminals, VoIP terminals) to communicate over the communication network 11.

As set forth above, the communication network 11 supports various types of communication, preferentially voice communication, to be conducted between the calling terminal 12 and a receptive call reception terminal 14 through the use of the primary contact number. As clearly illustrated, there may be several network paths or communication links that exist between the calling terminal 12 and the call reception terminal 14. Those skilled in the art would recognize that the communication network 11 illustrated in FIG. 1 should be viewed in an illustrative sense at that other components and other types of network paths could exist that are capable of establishing a communication link between calling terminals 12 and call reception terminals 14.

Referring once again to FIG. 4, the calling module 64 calls all of the call reception terminals 14 associated with the primary contact number being dialed by the calling terminal 12. At step 78, if the call receiver answers the call on a respective call reception terminal 14, the short introduction message recorded by the caller may be played back to the call receiver, which is represented at step 80. If the call receiver does not answer the call, at step 78 the call may be sent to a voice mail application 56 after a predetermined period of time or number of rings.

After the short introduction message is played to the call receiver at step 80, the call receiver may be prompted to accept or decline the call, which is represented at step 84. If the call receiver accepts the call, the call is then connected to the associated call reception terminal 14 by a call connection module 86. The call connection module 86 establishes a communication link or talk path between the calling terminal 12 and the respective call reception terminal 14 that the call receiver answers. If the call receiver declines to answer the call, the call may be sent to the voice mail application 56. As clearly set forth in the description above, the contact number encapsulation system 10 allows a user to associate a plurality of contact numbers with a single primary contact number, thereby reducing the amount of phone numbers people have to remember in order to communicate with the user. The user only needs to give out a single contact number to contacts instead of having to provide multiple numbers to others so that individuals can communicate with the user at various locations.

As set forth above, when the caller enters the service option module 52, one of the options that the caller may be presented is to directly enter voice mail of the call receiver instead of attempting to reach the call receiver. If the caller selects to leave a voice mail or is sent to the voice mail application 56 in the event the call receiver does not answer, the voice mail application 56 may prompt the caller to leave a voice mail and may record the voice mail, which is represented at step 88. Although not illustrated, the voice mail message may be stored in a voice mail database and may be stored such that it is associated with the call receiver (i.e.—the primary contact number). A voice mail email module 90 may be used to automatically send an email to a designated email account of the call receiver that contains the voice mail message as a file attachment in a designated file format.

The interactive voice response application 42 may also include a direct connection module 58 that may allow the call receiver to designate a predetermined contact number to be called if a caller dials the primary contact number. The direct connection module 58 allows the call receiver to designate a predetermined contact number to be used instead of the list of contact numbers used by the calling module 64. For example, the call receiver may be on vacation and may want to use a vacation contact number instead of the list of contact numbers that are called by the calling module 64.

Referring back to FIG. 3, the answering module 38 may also be operable to forward an incoming call to a facsimile module 94. If the answering module 38 detects a facsimile signal when the incoming call is answered, the answering module 38 automatically switches into facsimile reception mode and receives the incoming facsimile message through the facsimile module 94. After the facsimile is received, a facsimile email module 96 may convert the facsimile into a predetermined file format and send the file to a call receiver's designated email account. The call receiver may then view the facsimile by accessing an email application and opening up the attachment in a designated viewer.

Figure 5:
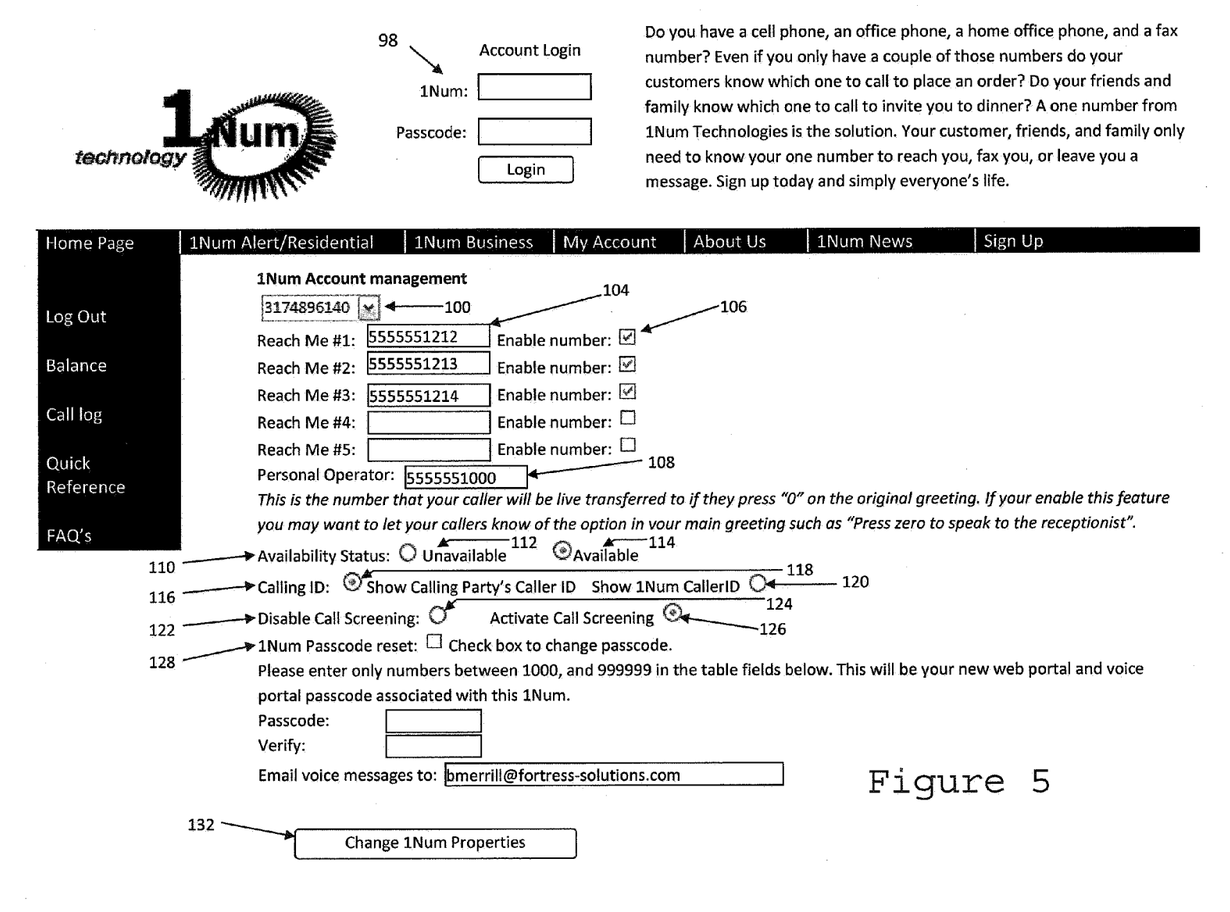
FIG. 5 represents an illustrative user account management interface that allows an account holder to modify their user account attributes and/or settings.

As illustrated in FIG. 5, the contact number encapsulation system 10 may also include a web-enabled user account interface 98 that allows an account holder to modify the account attributes associated with their respective primary contact number, which is illustrated in FIG. 5 at 100. The account holder may access the user account interface 98 by logging into their account via the Internet using a web-enabled terminal 14. For instance, the account holder may use a terminal 14 to access their account through ISP 76. The user account interface 98 functions as a control panel where the account holder may select and change various options and settings.

A comprehensive contact number list 102 may be included that allows the account holder to designate all of the contact numbers they want called when the primary contact number 100 receives an incoming data message (e.g.—telephone call, etc.). The comprehensive contact number list 102 may include a plurality of contact number entry fields 104 that allow a user to enter designated contact numbers that they want the calling module 64 to contact or call if the primary contact number 100 is contacted or dialed. The comprehensive contact number list 102 may be stored in the user database 44 and may be capable of being accessed by the call processor server 30. A plurality of contact number enablement fields 106 may also be included that allow a user to turn on or off respective contact numbers contained in the comprehensive contact number list 102.

The user account interface 98 may also include a personal operator designation field 108. The interactive voice response application 42 may also include an operator option that allows the account holder to designate an operator number that is called if, for example, a predetermined data input is entered by the caller once the answering module 38 answers the incoming call (e.g.—the caller presses "0" on a keypad of the terminal 12). For example, the account holder may have a personal assistant and if "0" is pressed by the caller, the call may then be routed to a contact number of the account holder's personal assistant. The direct transfer module 58 may be used to forward the call to a contact number entered in the personal operator designation field 108.

A user availability status field 110 may also be included that allows the account holder to indicate whether or not they are available to receive calls. If the account holder selects an unavailable option 112, the answering module 38 may automatically forward the call to the voice mail application 56. If the user selects an available option 114, the answering module 38 may forward the call to the interactive voice response application 42 or the multiple contact module 54. A caller identification control field 116 may also be included that allows the account holder to turn on and off caller identification functions. An incoming caller identification option 118 allows the account holder to enable the display of the contact number of the calling terminal 12 on the call receiving terminal 14. A primary contact number option 120 may cause the calling module 64 to display the primary contact number of the account holder on the call receiving terminal 14 instead of the contact number of the calling terminal 12.

A call screening designation field 122 may be included that allows the account holder to enable or disable the portion of the multiple contact module 54 that prompts the caller to record a short introduction message. A screen activation option 124 and a screen deactivation option 126 may be selected to turn this feature on and off. A passcode reset field 128 may be included that allows the account holder to change their respective access passcode. This passcode may be used to access voicemail or change settings associated with the primary contact number through the use of various types of remote terminals 14 (e.g.—wired telephones, wireless terminals, etc.) that may not have Internet access or be web-enabled. An email address designation field 130 may also be included that allows the account holder to designate the email address to which all voice mail messages and facsimiles may be forwarded. A store entry option 132 may be included that causes the settings or changes made by the account holder in the user account interface 98 to be stored in the user database 44 that contains account data about respective account holders assigned a primary contact number.

Figure 6:
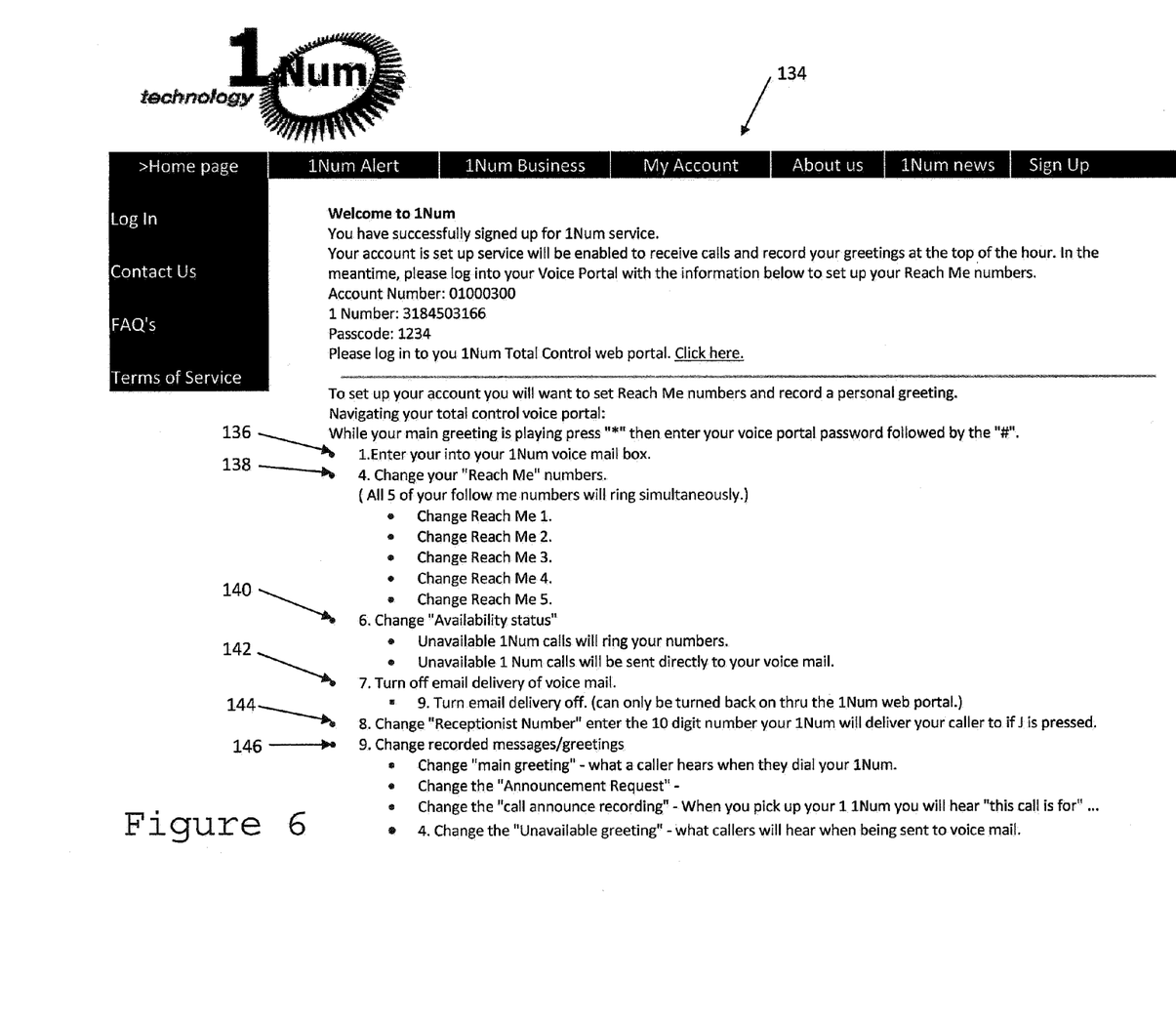
FIG. 6 represents an illustrative menu setup for a user account voice control portal.

Referring to FIG. 6, the call receiving terminals 14 may also have access to a service portal application 134 that may be accessed by dialing the primary contact number and pressing a predetermined key on a keypad of the terminal 14 (e.g.—by pressing the "*" key). The service portal application 134 allows account holders to modify settings or properties associated with their respective account through the use of terminals 14 that may not have Internet access by contacting the primary contact number. As set forth above, the account holder may use keys on a keypad associated with the terminal 14 to navigate a menu based interactive system.

As illustrated in FIG. 6, the service portal application 134 may include various options such as an enter voice mail option 136, a change assigned contact numbers option 138, an availability designation option 140, a turn off email delivery of voice mail option 142, a change personal operator number option 144, and a change recorded messages/greetings option 146. All of the options and their respective functionality should be readily apparent based on the detailed description of the embodiments set forth above and as such, they will not be repeated. Once all of the changes are entered, when the user disconnects or hangs up, the changes may be stored in the user database 44.

Figure 7A:
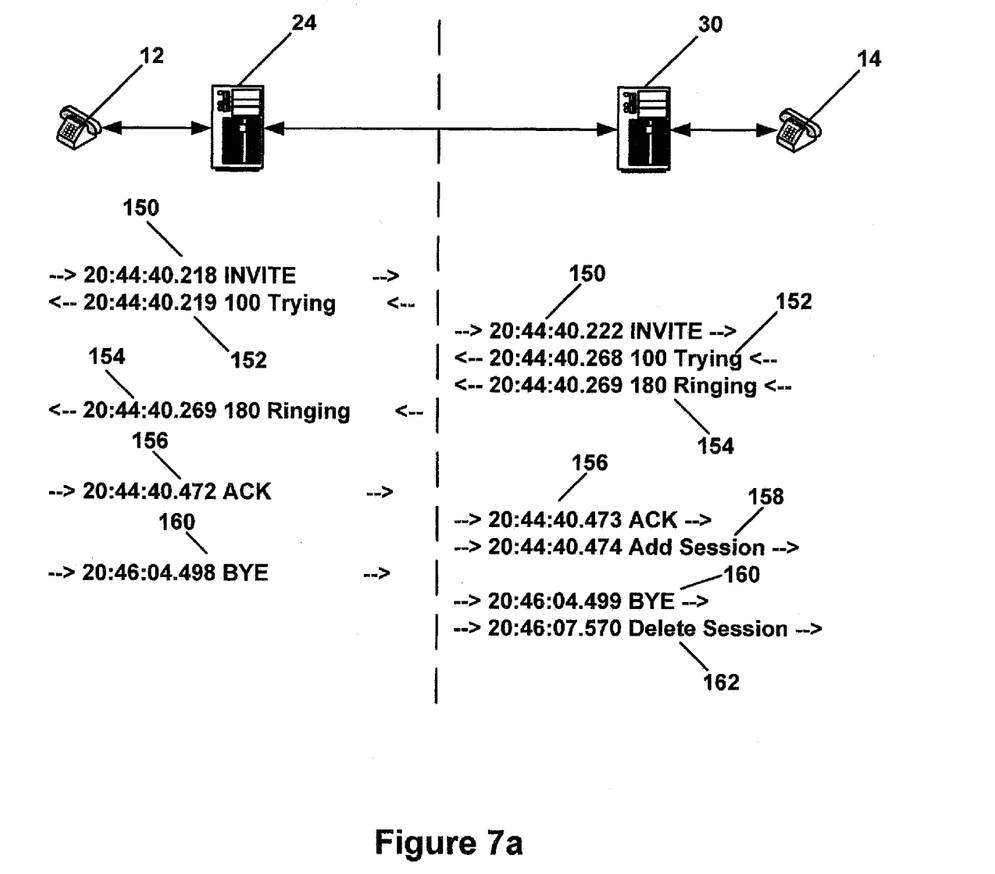
FIG. 7a illustrates representative SIP commands or methods used by the contact number encapsulation system to establish a session between a calling terminal and a call receiving terminal.

Referring to FIGS. 1 and 7a, the contact number encapsulation system 10 is operable to establish a session between a calling terminal 12 and a call reception terminal 14 using SIP commands or methods. FIG. 7a represents a few illustrative SIP commands that may be used to establish the session between the calling terminal 12 and the call reception terminal 14. To initiate a session, the call router 24 may receive, or may generate in response to an incoming call from the calling terminal 12, an INVITE command 150 that is sent over the communication network 10. The INVITE command 150 may be generated in response to a user of the calling terminal 12 dialing a primary contact number associated with a given user. The INVITE command 150 indicates that the user associated with the primary contact number is being invited to participate in the session.

The call router 24 may forward the INVITE command 150 to the call processor server 30. As set forth in detail below, the call router 24 uses a lookup routine to determine the IP address of the call processor server 30. An SIP informational response 152 may be generated by the call processor server 30 that may be sent to the call router 24. The SIP informational response 152 may indicate that the call processor server 30 is attempting or trying to add the session. A second SIP informational response 154, which may also be passed to the call router 24, may be generated by the call processor server 30 that indicates that the call processor server 30 is ringing the call reception terminal 14.

An acknowledge ("ACK") command 156 may be generated by the call router 24 to confirm that the call router 24 has received a final response from the call processor server 30 to the INVITE command 150. The ACK command 156 is sent to the call processor server 30. Once the ACK command 156 is received, an add session command 158 may be generated by the call processor server 30 that adds the session. At this point, the session between the calling terminal 12 and the call reception terminal 14 is established and RTP may be used to directly transmit media content between the respective terminals 12, 14. Once the session is over, a termination ("BYE") command 160 may be generated by either the call router 24 or the call processor server 30 that indicates that the session should be terminated. A delete session command 162 may then be generated by the call processor server 30 that deletes the session.

Figure 7B:
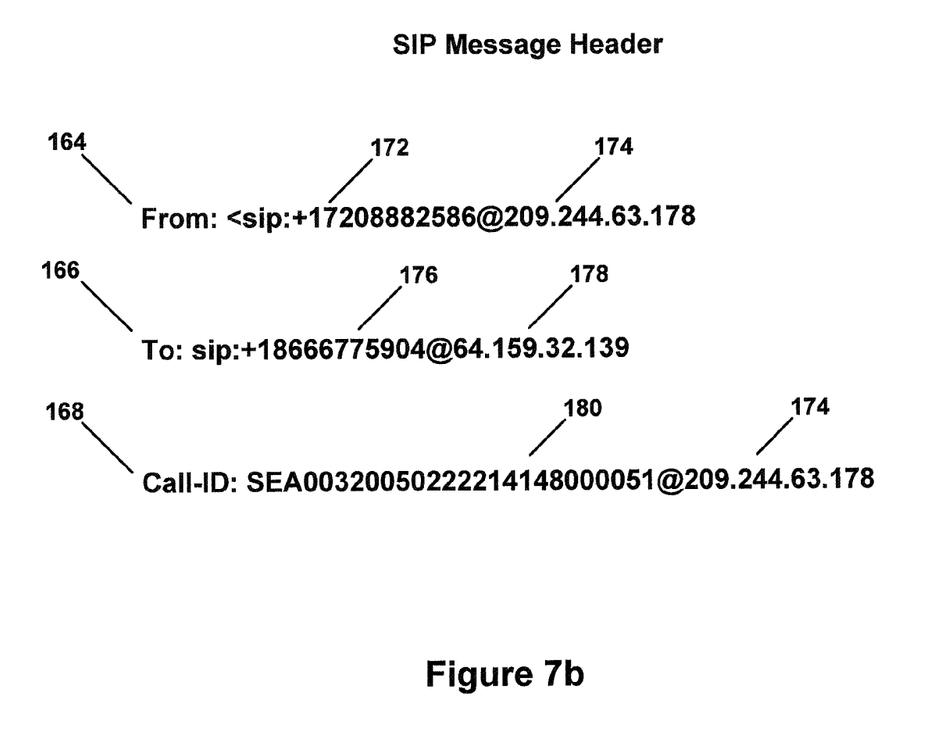
FIG. 7b illustrates representative SIP message header information used by the contact number encapsulation system to call a plurality of call receiving terminals.

Referring to FIGS. 1 and 7b, as previously set forth, the SIP message header that the call processor 30 receives may contain various data fields and SIP commands. The SIP message header may contain an origination field 164, a destination field 166, and a caller identification field 168. The origination field 164 may include a caller number field 172 and a caller IP address field 174. The caller number field 172 corresponds to the telephone number that is assigned to the calling terminal 12. The caller IP address field 174 corresponds to the IP address that the call processor server 30 should route data associated with the call, which typically corresponds to the call router 24.

The destination field 166 may include a primary contact number field 176 and a primary contact IP address field 178. The calling terminal 12 provides the information or data contained in the primary contact field 176 when a user dials a primary contact number. When the calling terminal 12 makes a call or attempts to establish a session by dialing a primary contact number, the call router 24 may obtain the primary contact IP address field 178 associated with the primary contact number from the database 28. The primary contact IP address field 178 corresponds to the IP address of the call processing server 30. As such, the call router 24 and the call processor server 30 are able to obtain IP addresses for one another so that data can be directed to the appropriate destinations. The caller identification field 168 is a unique field that is used to identify a call. A router gateway machine identification field 180 may be included to designate a particular call router 24 in case more than one call router 24 is associated with a given caller IP address field 174.

As previously set forth, the call processing application 32 uses the information contained in the SIP message header to lookup and simultaneously ring a plurality of contact numbers that are associated with the primary contact number. The simultaneous calling module 64 creates a session between each call reception terminal 14 associated with the primary contact number. Once a user answers one of the respective terminals 14, media (e.g.—the audio portion of the phone call) may be transmitted between the terminals 12, 14 using RTP. In the preferred embodiment, the media is transmitted directly from the call processor server 30 to the Internet portal 22 and avoids the call router 24.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A system, comprising:
   at least one first hardware device in communication with a carrier via an IP based network, wherein said at least one first hardware device is operable to receive a call to a primary contact number from said carrier over said IP based network;
   at least one second hardware device configured to receive said call from said at least one first hardware device;
   a first application operable to retrieve at least two or more contact numbers in response to said call;
   a second application operable to simultaneously call each of said at least two or more contact numbers;
   a third application operable to establish a communication session between a called device associated with one of said at least two or more contact numbers and a calling device placing said call if a user of said called device accepts said call; and
   a control panel accessible by a user, said control panel being operable to allow said user to add contact numbers to said at least two or more contact numbers, wherein said control panel is operable to allow said user to edit said at least two or more contact numbers, wherein said control panel is operable to allow said user to delete contact numbers from said at least two or more contact numbers, wherein said control panel further comprises a plurality of user designation fields, each one of said user designation fields being associated with a respective contact number of said at least two or more contact numbers and operable for entry of an indicator designating each contact number associated therewith as an activated contact number or a deactivated contact number, and wherein said control panel further comprises a display identifying each respective one of said at least two or more contact numbers as either being in an activated state or a deactivated state so that said user knows a current state of each of said two or more contact numbers; and
   wherein said second application does not call said deactivated contact numbers.

2. The system of claim 1, wherein said at least one second hardware device establishes an initial media session with said calling device associated with said call.

3. The system of claim 2, wherein during said initial media session a predefined message is played to a caller.

4. The system of claim 3, wherein said predefined message prompts said caller to provide an identifier.

5. The system of claim 4, wherein said identifier is played to said user on said called device prior to establishing said communication session between said called device and said calling device.

6. The system of claim 1, wherein said IP network uses session initiation protocol (SIP) to transmit said call over said IP network from said carrier to said at least one first hardware device.

7. The system of claim 1, wherein said control panel comprises a web-enabled user interface.

8. The system of claim 1, wherein said control panel allows said user to enter an email address associated with said user.

9. The system of claim 1, wherein said at least one second hardware device is configured to receive said call from said at least one first hardware device via a second IP network, wherein said call is transmitted from said at least one first hardware device to said at least one second hardware device using session initiation protocol (SIP) over said second IP network.

10. The system of claim 1, wherein said at least one first hardware device comprises at least one call router.

11. The system of claim 1, wherein said at least one second hardware device comprises at least one call processing server.

12. The system of claim 1, wherein said least one second hardware device is configured to receive said call from said at least one first hardware device via a second IP network.

13. A system, comprising:
   at least one router in communication with a carrier via an IP based network, wherein said at least one router is operable to receive a call generated by a calling device to a primary contact number from said carrier over said IP based network;

at least one call processor configured to receive said routed call from said at least one router; wherein said at least one call processor receives said routed call from said at least one router via a second IP network, wherein said at least one call processor includes a first application operable to retrieve at least two or more contact numbers in response to said call;

a second application associated with said at least one call processor operable to simultaneously call each of said two or more contact numbers;

a third application associated with said at least one call processor operable to establish a communication session between said calling device and a called device associated with one of said at least two or more contact numbers if a user of said called device accepts said call;

a fourth application associated with said at least one call processor operable to record a voicemail message if said user does not accept said call; and a web-based control panel accessible by said user that allows said user to enter said at least two or more contact numbers associated with said primary contact number, wherein said web-based control panel is operable to allow said user to edit respective contact numbers contained in said at least two or more contact numbers, wherein said web-based control panel is operable to allow said user to add contact numbers to said at least two or more contact numbers, wherein said web-based control panel is operable to allow said user to delete one or more contact numbers contained in said at least two or more contact numbers, wherein said web-based control panel is operable to allow said user to select or deselect an indicator associated with each of said at least two or more contact numbers to designate each respective contact number as either an activated contact number or a deactivated contact number, and wherein said web-based control panel is operable to visibly identify each contact number of said at least two or more contact numbers in said web-based control panel as either an activated contact number or a deactivated contact number; and wherein said second application only simultaneously calls said activated contact numbers.

14. The system of claim 13, wherein said at least one router routes said call to said at least one call processor via said second IP network using session initiated protocol (SIP).

15. The system of claim 13, wherein an email notification is sent to said user indicating receipt of said voicemail message.

16. The system of claim 15, wherein said email notification includes a copy of said voicemail message.

17. The system of claim 13, wherein said web-based control panel is operable to allow said user to control whether a caller's identification associated with said calling device is displayed on said called device or said primary contact number associated with said user is displayed on said called device.

18. The system of claim 13, wherein said web-based control panel includes a call screening selection item that allows said user to enable or disable a call screening feature.

19. The system of claim 18, wherein said web-based control panel includes a do not disturb selection item that allows said user to enable or disable a do not disturb feature.

20. A system, comprising:

at least one first hardware device in communication with a carrier via an IP based network, wherein said at least one first hardware device is configured to receive a call from a calling device to a primary contact number from said carrier over said IP based network, at least one second hardware device configured to receive said call routed from said at least one first hardware device via a second IP based network, wherein said call is sent to said at least one second hardware device by said at least one first hardware device over said second IP based network using session initiation protocol (SIP);

a first application operable to retrieve at least two or more contact numbers in response to said call;

a second application operable to simultaneously call each of said two or more contact numbers;

a third application operable to establish a communication session between a called device associated with one of said two or more contact numbers and said calling device if a user of said called device accepts said call; and a control panel accessible by said user, said control panel being operable to allow said user to add contact numbers to said at least two or more contact numbers, wherein said control panel is operable to allow said user to edit said at least two or more contact numbers, wherein said control panel is operable to allow said user to delete contact numbers from said at least two or more contact numbers, wherein said control panel further comprises a plurality of user designation fields, each one of said user designation fields being associated with a respective contact number of said at least two or more contact numbers and operable for entry of an indicator designating each contact number associated therewith as an activated contact number or a deactivated contact number, and wherein said control panel further comprises a display visibly identifying each respective one of said at least two or more contact numbers as either being in an activated state or a deactivated state so that said user knows a current state of each of said two or more contact numbers; and wherein said second application only calls said activated contact numbers.

* * * * *